United States Patent
Jia et al.

(10) Patent No.: US 7,392,256 B2
(45) Date of Patent: Jun. 24, 2008

(54) DATA GATHER SCATTER—REDISTRIBUTION MACHINE

(75) Inventors: Bin Jia, Poughkeepsie, NY (US); Richard R. Treumann, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 10/963,091

(22) Filed: Oct. 12, 2004

(65) Prior Publication Data

US 2005/0060714 A1    Mar. 17, 2005

Related U.S. Application Data

(63) Continuation-in-part of application No. 09/517,167, filed on Mar. 2, 2000, now Pat. No. 6,820,264.

(51) Int. Cl.
*G06F 7/00* (2006.01)
(52) U.S. Cl. .......................... 707/100; 710/22; 719/328
(58) Field of Classification Search ................. 711/100; 719/328, 310; 710/5, 6, 22, 33; 707/100
See application file for complete search history.

(56) References Cited

U.S. PATENT DOCUMENTS

| | | | | |
|---|---|---|---|---|
| 5,590,313 A | * | 12/1996 | Reynolds et al. | ............... 703/26 |
| 5,608,906 A | * | 3/1997 | Tonouchi et al. | ............ 718/107 |
| 5,721,895 A | * | 2/1998 | Velissaropoulos et al. | ....................... 707/104.1 |
| 5,778,223 A | * | 7/1998 | Velissaropoulos et al. | ... 707/100 |
| 5,805,821 A | | 9/1998 | Saxena et al. | |
| 5,862,340 A | * | 1/1999 | Reynolds | ..................... 709/228 |
| 5,884,050 A | * | 3/1999 | Wheeler et al. | ............. 710/107 |
| 5,968,153 A | * | 10/1999 | Wheeler et al. | ............. 710/110 |
| 6,105,075 A | * | 8/2000 | Ghaffari | ........................ 710/5 |
| 6,519,645 B2 | | 2/2003 | Markos et al. | |
| 2003/0037202 A1 | * | 2/2003 | Kedem et al. | ............... 711/100 |

OTHER PUBLICATIONS

NN9612133, "Gather/Scatter Pipe Interface", IBM Technical Disclosure Bulletin, Dec. 1996, US.*

* cited by examiner

*Primary Examiner*—Tim Vo
*Assistant Examiner*—Garrett Smith
(74) *Attorney, Agent, or Firm*—Lawrence D. Cutter; Jon A. Gibbons; Fleit Kain Gibbons Gutman Bongini & Bianco P.L.

(57) ABSTRACT

A method, system, and computer program product to transfer data between two application data structures by copying a data gather scatter program (DGSP) from an exporting process address space where a first data structure is located, to a location in shared memory visible to an importing process address space; assembling a parameter set identifying the data structure; starting a data gather scatter-redistribution machine (DGS-RM) in an importing process space where a second application data structure is located; passing the first parameter set, the DGSP copy, and a second parameter set identifying a second application data structure and a second DGSP to the DGS-RM; and creating master and worker stack machines. The master stack machine identifies a contiguous chunk of the first data structure. The worker stack machine identifies contiguous chunks of the second data structure representing the same number of bytes as the contiguous chunk of the first data structure and transferring to (from) one or more identified chunks of the second data structure from (to) the single chunk of the first application data structure.

8 Claims, 10 Drawing Sheets

DATA GATHER SCATTER—REDISTRIBUTION MACHINE

CROSS-REFERENCE TO RELATED ART

This application is a continuation-in-part of U.S. patent application Ser. No. 09/517,167, entitled "Data Gather/Scatter Machine," filed on Mar. 2, 2000 now U.S. Pat No. 6,820,264, the entire disclosure of which is herein incorporated by reference.

FIELD OF THE INVENTION

The invention relates to multiprocessor computers and more particularly to directly transferring data between discontiguous data buffers belonging to different processes.

BACKGROUND OF THE INVENTION

Message Passing Interface (MPI) defines a standard application programming interface (API) for using several processes at one time to solve a single large problem, or a "job," on a multiprocessor and often multi-node computer (i.e., commonly one process per CPU across 1 or more multi CPU nodes). Each job can include multiple processes. A process can also commonly be referred to as a task. Each process or task can compute independently except when it needs to exchange data with another task. The program passes the data from one task to another as a "message." Examples of multiprocessor computers are, e.g., an IBM eServer Cluster 1600 available from IBM Corporation, Armonk, N.Y., and supercomputers available from Cray, Silicon Graphics, Hewlett Packard and the like.

The primary purpose of a Data Gather Scatter Program/Data Gather Scatter Machine (hereinafter referred to as DGSP/DGSM or DGSM) is to provide an efficient, portable solution for handling MPI datatypes in MPI operations. DGSM is described in the co-pending, commonly-assigned herewith, U.S. patent application Ser. No. 09/517,167, entitled "Data Gather/Scatter Machine," filed on Mar. 2, 2000, the entire disclosure of which is herein incorporated by reference. It is important to note that any API that allows data of arbitrarily complex discontiguity to be described for the purpose of copying it could also use the DGSP/DGSM techniques. All MPI message passing is performance sensitive so efficient treatment of MPI datatypes is crucial. Some MPI operations, such as MPI-1 sided and MPI-IO, require that the representation of a datatype, defined by the application at one task of a MPI job, be interpreted at another task. Thus, portability of the representation is also required.

The DGSP/DGSM mechanism involves compiling a low level "program" (DGSP) for each MPI datatype the application constructs. This DGSP can be used in the task where it is created or delivered to another task. When delivered to another task, that other task can run the DGSP. A DGSP is run on a stack "machine" (DGSM) implemented in software to interpret the layout of a datatype and handle the data transfer.

The DGSP is a compact, portable and general representation of any MPI datatype, consisting of five basic DGSM instructions: COPY, MCOPY, GOSUB, ITERATE and CONTROL. Since the underlying communication subsystem for which the original DGSM was developed provides a buffered contiguous data stream between tasks, a basic DGSM assumes that at least one of the two buffers it performs on is contiguous. One of these "buffers", the one which can be discontiguous, is normally an application defined data structure rather than a usual communication buffer. DGSM executes a gather from a discontiguous buffer (an application data structure) to a contiguous staging buffer, or a scatter from a contiguous staging buffer to an application data structure.

In certain shared memory optimizations, the data of a data structure belonging to one task, defined by a datatype created at that task needs to be copied into a data structure at some other task on the same OSI (Operating System Image). The datatype defining the data structure belonging to the second task has been created only at the second task. Each datatype is available only within the address space of the task where it was created. The datatype created by each task will have been compiled into a DGSP, also available only within the address space of the task where it was created. A common solution for a data transfer between two discontiguous application data structures having non-uniform data layouts is to stage the transfer through a contiguous intermediate buffer. When the data structures belong to different tasks, the intermediate buffer must be in shared memory which is addressable by both tasks.

In this approach, data is first gathered from the source application buffer into the intermediate buffer and then scattered from the intermediate buffer to the destination application buffer. The DGSP/DGSM mechanism can be applied to both the gather and the scatter. Since the intermediate buffer size is always limited, buffer reuse has to be supported in a fill/drain cycle. The basic DGSM is designed to be activated repeatedly, each time being told how many bytes to process. The state of the machine at the end of one activation is retained so the next activation can resume, with respect to the application buffer, where the previous activation left off. To allow reuse of a single staging buffer or of a pool of staging buffers, each activation of the DGSM is provided with a new pointer to space in the intermediate buffer along with the number of bytes to be copied. At the data source side one DGSM gathers the requested number of bytes into the intermediate buffer. Then at the data destination side another DGSM scatters a specified number of bytes from the intermediate buffer to a discontiguous application data structure. One DGSM runs in each process and each DGSM depends on the DGSP and other information created within the address where that DGSM runs. A few variables in shared memory allow the gather DGSP to tell the scatter DGSP that the staging buffer has been filled so the scatter can begin. Later, the scatter DGSP tells the gather DGSP that all data from the staging buffer has been scattered and the buffer may be overwritten with more data. The cycle can continue until all data has been transferred via the staging buffer. There is no distinction between a DGSP to be interpreted for source (gather) or for destination (scatter) DGSM runs. The DGSP "machine instruction" COPY differs for gather or scatter only in which direction it copies the specified number of bytes.

FIG. 1 illustrates the structure of this prior art staging buffer approach. A discontiguous source application data structure 100 containing chunks of contiguous data with gaps in between is copied to a contiguous intermediate buffer 102 by way of a gather DGSM 103. The gather function uses a state cache 105 and a source DGSP 107 to control its progress. Next, a scatter DGSM 104 is used to write the data contained in the contiguous intermediate buffer 102 to a discontiguous destination application data structure 101. A state cache 106 and destination DGSP 108 are used to control the progress of the scatter function. A set of variables 109 in shared memory is used by both DGSMs 103 and 104 to allow them to take turns with fill/drain of the contiguous intermediate buffer 102.

Since each byte is copied twice in going from the source to the destination, this solution is inefficient in terms of time taken for data transfer and CPU demand; especially when the size of the data to be transferred is large. More severely, any memory system bandwidth bottleneck is double stressed by this two stage approach. Therefore a need exists to overcome the problems with the prior art as discussed above.

SUMMARY OF THE INVENTION

An embodiment of the present invention is directed to a method, system and computer program product for transferring data between two application data structures. The method, called a cross memory attach function, includes copying a first data gather scatter program (DGSP) from an exporting process address space where a first application data structure is located to a location in shared memory that is visible to an importing process address space; assembling a first parameter set in the shared memory location that identifies the first application data structure in the exporting process address space; starting a data gather scatter-redistribution machine (DGS-RM) in an importing process space where a second application data structure is located; passing the first parameter set and the copy of the first DGSP to the DGS-RM, both the first parameter set and copy having been copied to shared memory, and a second parameter set identifying the second application data structure and a second DGSP, both local to the importing process space; and creating a master stack machine and a worker stack machine.

The method has a pull mode and a push mode. In the pull mode the master stack machine, running under control of the DGSP previously copied from the exporting process space, identifies a contiguous chunk of the first application data structure in the exporting process address space. Next, the worker stack machine running under control of the DGSP in the importing process address space, identifies as many contiguous chunks of the second application data structure in the importing process address space, as needed to receive all bytes of the contiguous chunk of the first application data structure, and then copies (pulls) the bytes of the identified chunk of the first application data structure, from the first application data structure to the as many as needed identified contiguous chunks of the second application data structure.

In the push mode the master stack machine, running under control of the DGSP previously copied from the exporting process space, identifies a contiguous chunk of the first application data structure in the exporting process address space. Next, the worker stack machine running under control of the DGSP in the importing process address space, identifies as many contiguous chunks of the second application data structure in the importing process address space, as needed to supply the bytes needed for the contiguous chunk of the first application data structure, and then copies (pushes) the bytes for the identified chunk of the first application data structure, to the first application data structure from the as many as needed identified contiguous chunks of the second application data structure memory.

The master stack machine identifies the contiguous chunk of the first application data structure step by attaching a memory segment where a current chunk of the first application data structure is located, calculating a relocation constant by subtracting a segment address of the first application data structure in the exporting process space from a segment address at which the attached memory segment is mapped in the importing space, and determining if the contiguous chunk of the first application data structure crosses a segment boundary.

If the contiguous chunk of the first application data structure does not cross a segment boundary, then the method processes the currently attached chunk and proceeds to the next chunk of the first application data structure to be copied to or from.

If the contiguous chunk of the first data structure does cross a segment boundary, then the method determines the length of a contiguous fragment of the current chuck of the first application data structure contained within the current memory segment, processes the current fragment, detaches the attached memory segment, attaches a subsequent segment, and calculates a new relocation constant.

The method works for both contiguous and discontiguous data structures. The application data structures may be located within the same address space or different address spaces.

The method works in conjunction with prior art methods to determine the most efficient manner of transferring data by caching the average length of contiguous data chunks represented by a single interpretation of a data gather scatter program (DGSP) with the DGSP as a granularity metadata and determines if the granularity metadata exceeds a predetermined granularity threshold. If the granularity metadata is less than or equal to the predetermined granularity threshold, then the method allocates an intermediate buffer and runs two data gather scatter machines (DSGM)—the first DGSM to copy data from a data source application data structure to the intermediate buffer and the second DGSM to copy data from the intermediate buffer to a data destination application data structure.

If the granularity metadata exceeds the predetermined granularity threshold, then the method determines if the total amount of data to be transferred exceeds a predetermined data threshold. If the total amount of data to be transferred is less than the predetermined data threshold, then the method again allocates an intermediate buffer and runs two data gather scatter machines (DSGM), the first DGSM to copy data from a data source application data structure to the intermediate buffer and the second DGSM to copy data from the intermediate buffer to a data destination application data structure. But, if the total amount of data to be transferred is exceeds the predetermined data threshold, then the cross memory attach function is performed.

BRIEF DESCRIPTION OF THE DRAWINGS

The foregoing and other features and advantages of the invention will be apparent from the following, more particular description of an exemplary embodiment of the invention, as illustrated in the accompanying drawings.

DETAILED DESCRIPTION OF THE INVENTION

An exemplary embodiment of the invention is discussed in detail below. While specific implementations are discussed, it should be understood that this is done for illustration purposes only. A person skilled in the relevant art will recognize that other components and configurations may be used without parting from the spirit and scope of the invention.

OVERVIEW OF THE INVENTION

Data Gather Scatter-Redistributed Machine (DGS-RM), is an extension to DGSM for support of efficient data transfer between two non-uniform, discontiguous application data structures. There is a potential for using this DGS-RM in any situation where possibly discontiguous data residing in one address space needs to be copied to another address space where the destination layout is also potentially discontiguous. The described embodiment involves copying data from one address space to another; however, a simplified DGS-RM could be applied to copy from one discontiguous data buffer to a second discontiguous data buffer in a single address space. MPI creates this need for discontiguous to discontiguous copying but other multi-process "jobs" could also. The compilation of a DGSP discussed in the prior cross-referenced U.S. patent application Ser. No. 09/517,167 is more closely tied to MPI than is the data transfer engine (DGSM of the prior application) or DGS-RM.

Figure 2:
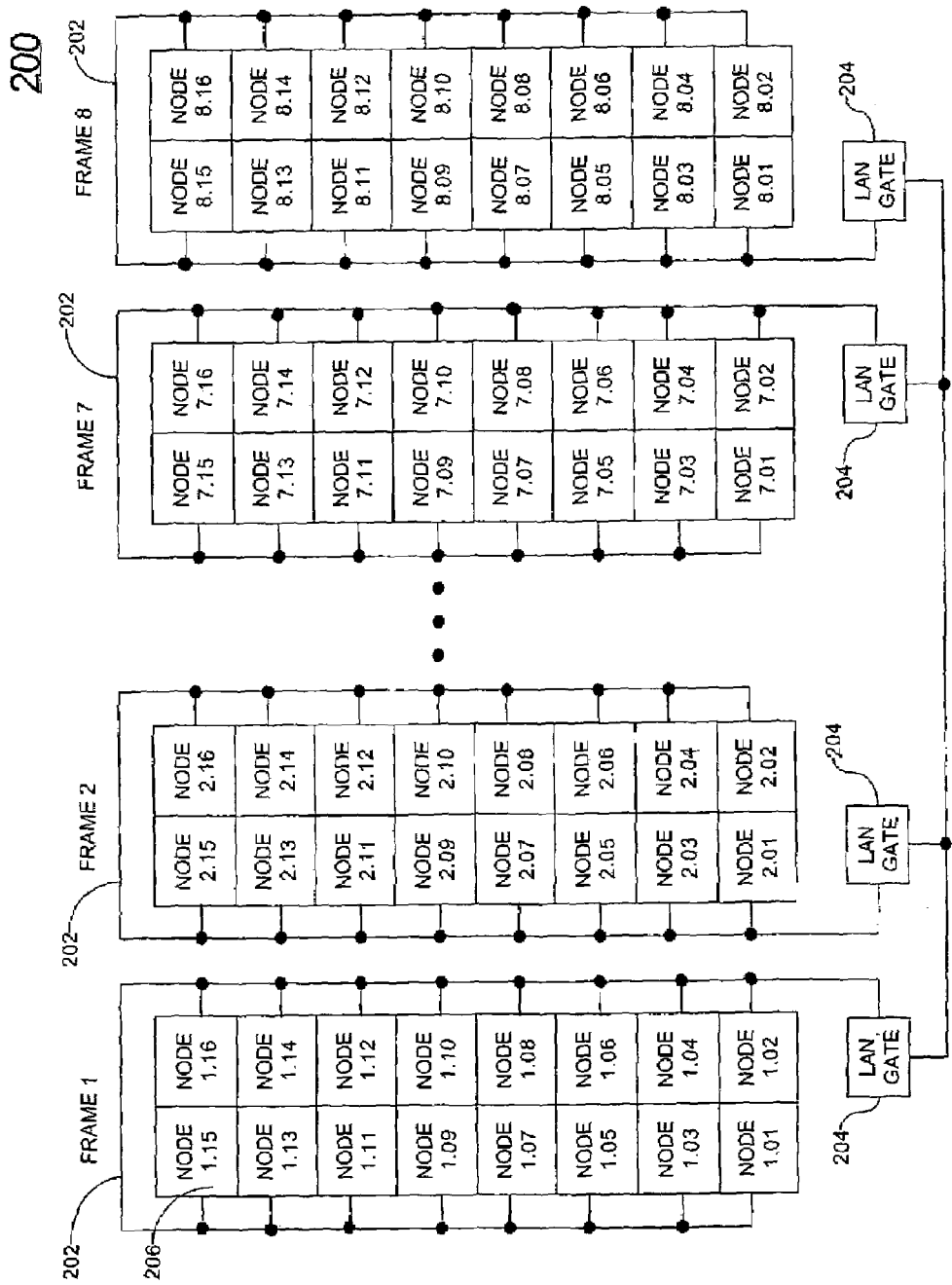
FIG. 2 depicts one example of a distributed computing environment incorporating the principles of the present invention.

In one embodiment, the mechanisms of the present invention are incorporated and used in a distributed computing environment, such as the one depicted in FIG. 2. An exemplary distributed computing environment 200 includes, for instance, a plurality of frames 202 coupled to one another via a plurality of LAN gates 204. Frames 202 and LAN gates 204 are described in detail below.

In one example, distributed computing environment 200 includes eight (8) frames, each of which includes a plurality of Systematic Multi Processor (SMP) nodes 206. Since an SMP (Symmetric Multi Processor) node normally runs all Central Processing Units (CPUs) under a single OSI, the terms OSI and SMP can be considered interchangeable in this discussion. In one instance, each frame includes sixteen (16) processing nodes. Each processing node is, for instance, an RS/6000 (or RISC System/6000) computer running AIX, a UNIX based operating system. Each processing node within a frame is coupled to the other processing nodes of the frame via, for example, an internal LAN connection. Additionally, each frame is coupled to the other frames via LAN gates 204.

As examples, each LAN gate 204 includes either an RS/6000 computer, any computer network connection to the LAN, or a network router. However, these are only examples. It will be apparent to those skilled in the relevant art that there are other types of LAN gates, and that other mechanisms can also be used to couple the frames to one another.

In addition to the above, the distributed computing environment of FIG. 2 is only one example. It is possible to have more or less than eight frames, or more or less than sixteen nodes per frame. Further, the processing nodes do not have to be RS/6000 computers running AIX. Some or all of the processing nodes can include different types of computers and/or different operating systems. All of these variations are considered a part of the claimed invention.

In an embodiment of the present invention, in shared memory optimizations, it is often necessary for a datatype defined at one task or process to be interpreted at some other tasks on the same OSI (Operating System Image). These shared memory optimizations exploit a dynamic cross-memory attach mechanism to avoid half the memory copies. The dynamic cross-memory attach mechanism enables one task of a parallel job to register a message source or destination memory range representing a message buffer (i.e. containing an application data structure) as a shared memory region, which can be attached by other tasks running on the same OSI. The attached memory is mapped into the address space of the attaching task. Since these message buffers are normally working data structures in the application, their location and layout is determined by the needs of the application rather than by a communications subsystem. Once an export and attach is set up, data can be transferred directly from one task's message buffer to another task's. The MPI standard allows, for any given data transfer in collective communication, a different data layout at different tasks as long as the message type signatures are identical (e.g. a message of 100 contiguous integers and one of 100 discontiguous integers have identical type signatures because each represents 100 integers). Data layout in the registered region could be different from the data layouts in the communication buffers of those tasks who attach the registered region, and both could be discontiguous. The principles of the present invention extend the basic DGSM concepts to support data transfer between two non-uniform, discontiguous application data structures, both within a single address space and via cross memory attach.

Figure 3:
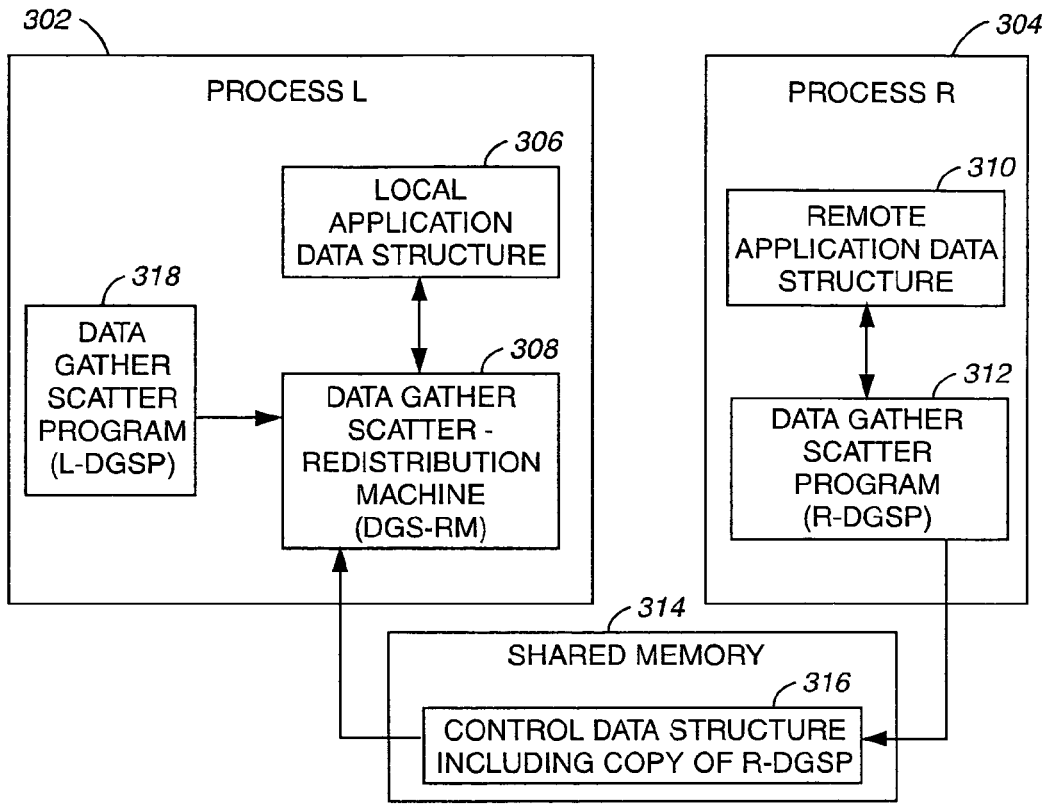
FIG. 3 depicts an exemplary cross memory attach system in accordance with one embodiment of the present invention.

Referring initially to FIG. 3, a Task-L running in address space 302 and a Task-R running in address space 304 each owns an application data structure 306, 310, respectively. A DGS-RM 308 runs in a single process space or task space, so when there are two tasks involved, one side of the data transfer is chosen to run the DGS-RM. This means one data gather/scatter program (DGSP) 312 originates in an exporting task space (i.e., the space registering the memory object) remote from the DGS-RM 308 and the DGSP 312 is to be first delivered to the task which is to run the DGS-RM 308 by copying it to a shared memory 314, which is visible to the task which will run DGS-RM 308. The compactness and portability of a DGSP 312 makes this practical.

The task space in which DGS-RM 308 runs, or the attaching task space, is referenced as Task-L 302 (for local) and the task where the remote application data structure 310 and DGSP 312 reside is Task-R 304 (for remote). When there is one source data structure and one destination data structure, the decision as to which process is to run the DGS-RM 308 is arbitrary. In one example, Task-L 302 is selected to run DGS-RM 308 and Task-R 304 sets up for that run by exporting the address range (i.e., memory object) containing its application data structure 310 and copying its DGSP 312, as well as information needed for attaching that exported range, to a control data structure 316 located in shared memory 314 where DGS-RM 308 can access it.

Figure 4:
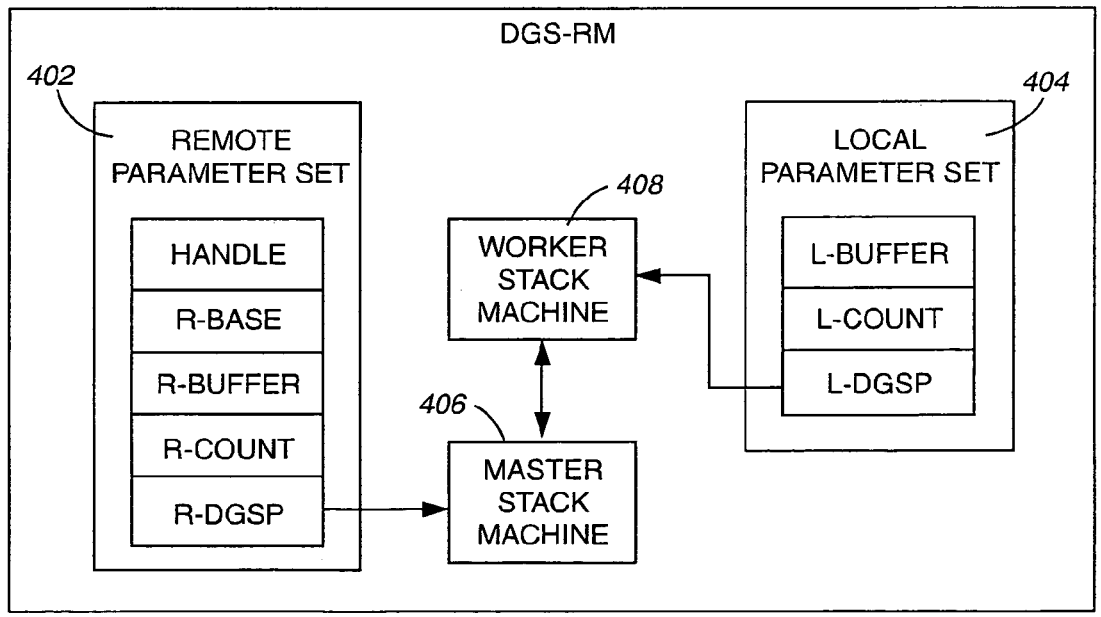
FIG. 4 depicts one example of a Data Gather Scatter-Redistribution Machine (DGS-RM) of the cross memory attach system of FIG. 3, in accordance with the principles of the present invention.

As part of the action of exporting an address range, a process returns a cross-memory handle (identifier) which another process can use to attach that memory. This handle is among the information transferred in the shared memory control space 314. Referring now to FIG. 4, when the DGS-RM 308 is to start in process space L 302, it will input a parameter set 402 (handle,R-base,R-buffer,R-count,R-DGSP) representing the remote application data structure 310, delivered via the control data structure 316 in the shared memory segment 314, and a second locally available parameter set 404 (L-buffer,L-count,L-DGSP) representing the local data structure 302. The DGS-RM routine 308 will then create and run two stack "machines", one for each DGSP. Of the two machines, one has a role as master machine 406 and the other as the worker machine 408. In one embodiment of this cross memory implementation, the master DGSM 406 interprets R-DGSP 312 while the worker DGSM 408 interprets L-DGSP 318. The reverse convention in which the worker processes R-DGSP is also workable but this choice to have R-DGSP always processed by the master makes the management of segment boundaries (to be discussed below) easier to implement.

For convenience in the description of push and pull, the operation is viewed from the vantage of the local process 302 running the DGS-RM 308 rather than from the remote process 304 exporting a memory object. However, there are no limitations in defining push-pull process from the vantage point of the remote process 304. Thus, there are two modes of operation: push and pull. This classification is based on whether the data is pulled from the remote process' 304 exported memory or pushed into it. In the pull mode, the master machine is for the gather side data handling and worker machine is for the scatter side, while the other way around is the push mode. By incorporating two DGS-RM running modes, the decision about where the DGS-RM runs is independent of the direction in which the data is to flow. This allows more versatility in choosing the specific side of the transfer on which to run the DGS-RM, allowing for consideration of other factors in addition to the data movement direction. In one embodiment of the cross-memory attach mechanism of the present invention, data transfer is carried forward (i.e. the DGS-RM is run) by the task which attaches the registered shared memory region. The DGS-RM runs in the importing task memory space so that it is able to access the memory space of both the importing task and the exporting task. This attaching task can be either the source of the data or the destination. A single export can include a number of memory segments, but the attach is performed one segment at a time, so special treatment is needed for application data structures that cross a segment boundary in the registered shared memory region. In a present embodiment, implementing this logic in the master machine 406 is more convenient.

The worker stack machine 408 within DGS-RM 308 is similar to a basic DGSM. Each activation of the worker machine 408 by the master 406 is provided an address of an accessible contiguous chunk of remote memory 310 and the number of bytes to be copied into that segment in the push mode, or to be copied out of that segment in the pull mode. Like the difference between the gather and scatter in running DGSM, the difference between the DGS-RM worker machine 408 running in the two modes lies in the handling of the COPY instruction; in which direction it copies the specified number of bytes.

Note that a "chunk" of memory is any contiguous portion of memory defined by the layout of the application data structure, regardless of length or segment boundaries (i.e. the size of one chunk may or may not be the same size as another chunk and may not necessarily be contained within a single memory segment). For purposes of this application, the words "chunk", "block", and "section" may be used interchangeably, even though there may be slightly different connotations in meaning. Further, the word "fragment" is used to refer to any contiguous portion of a chunk contained entirely within one segment.

The master stack machine 406 is a variant of a DGSM. In the basic DGSM, a COPY instruction represents a contiguous chunk of an application data structure and enough bytes are to be copied from a staging or other contiguous buffer to fill it for scatter, or to drain it for gather. In DGS-RM, a master machine COPY instruction still represents a contiguous chunk of an application data structure to be filled/drained. But rather than transferring the contiguous chunk by a memory copy, the COPY instruction will invoke the worker machine 408 to process the data.

Figure 5:
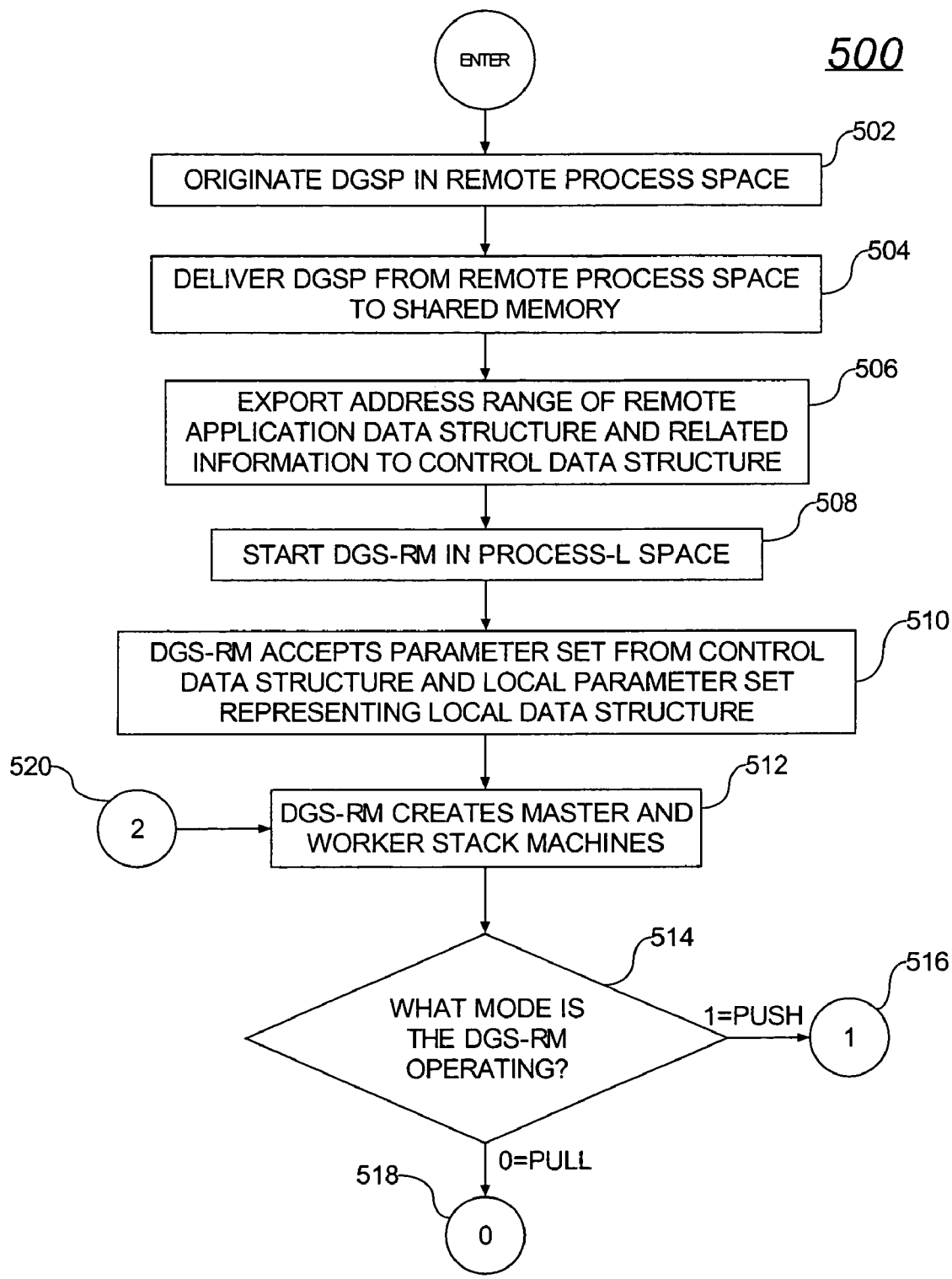
FIG. 5 is an operational flow diagram illustrating an exemplary operational sequence for performing a cross-memory attach function using a DGS-RM, in accordance with an embodiment of the present invention.
Figure 8:
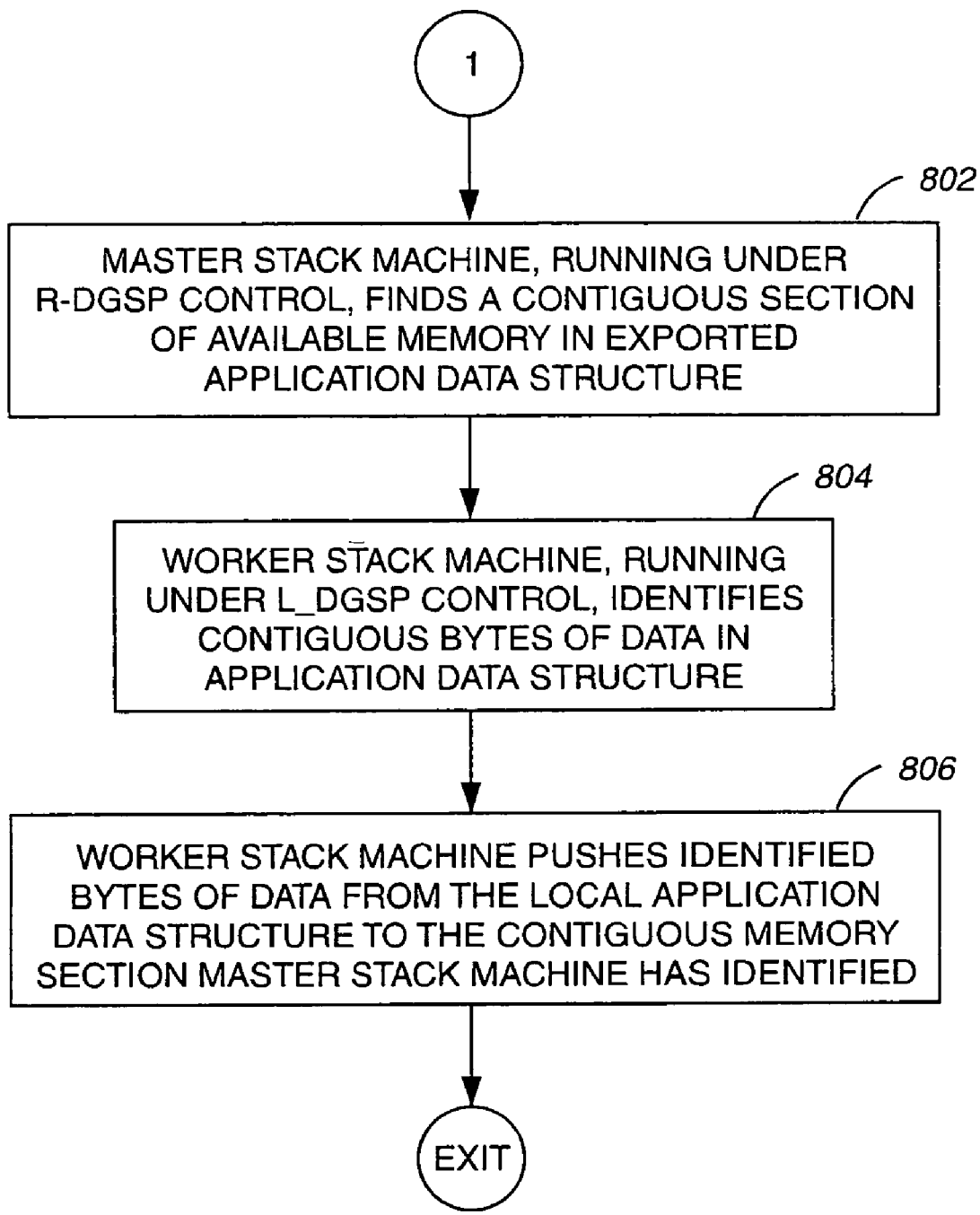
FIG. 8 is an operational flow diagram illustrating an exemplary operational sequence for performing a cross-memory function using a DGS-RM operating in a "push" mode, according to an embodiment of the present invention.

An operational flow diagram of the cross memory attach function is depicted in FIG. 5. First, a DGSP 312 is originated in the remote process space 304, at step 502. Next, this DGSP 312 is delivered, at step 504, from the remote process space 304 to shared memory 314. At step 506, the address range of the remote application data structure 310, and the above mentioned related information (handle) are also exported to a control data structure 316 within the shared memory 314. Next, the DGS-RM 308 is started in the local process space 302, at step 508. The DGS-RM 308 accepts the remote parameter set 402 from the control data structure 316, as well as a local parameter set 404 representing the local data structure 306, at step 510. Next, at step 512, the DGS-RM 308 creates a master stack machine 406 and a worker stack machine 408, and then determines the operating mode (pull or push) at step 514. If the operating mode is "push", the DGS-RM 308 will perform the push function 516 shown in FIG. 6. If the operating mode is "pull", the DGS-RM 308 will perform the pull function 518 shown in FIG. 8.

Figure 6:
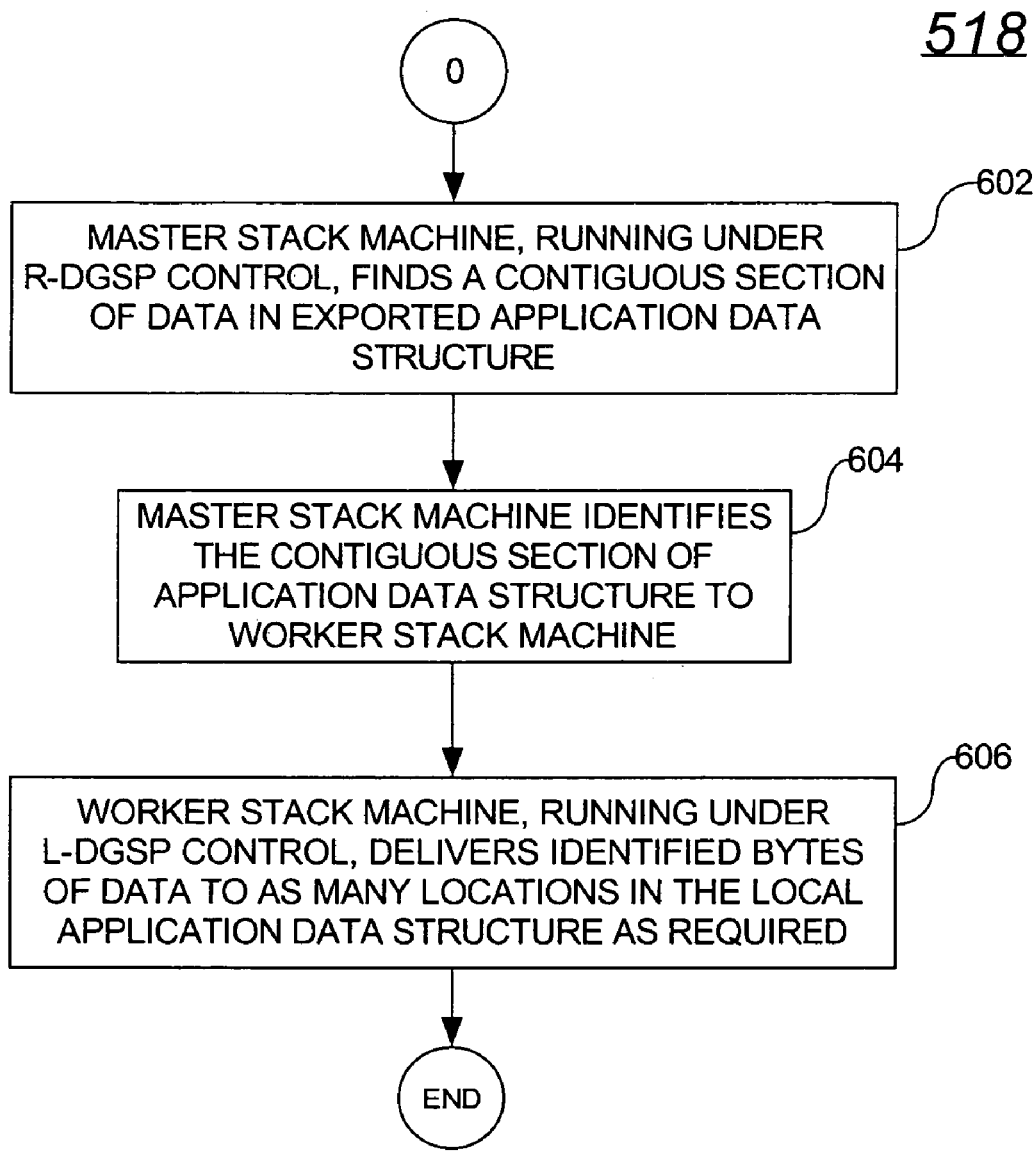
FIG. 6 is an operational flow diagram illustrating an exemplary operational sequence for performing a cross-memory function using a DGS-RM operating in a "pull" mode, according to an embodiment of the present invention.
Figure 7:
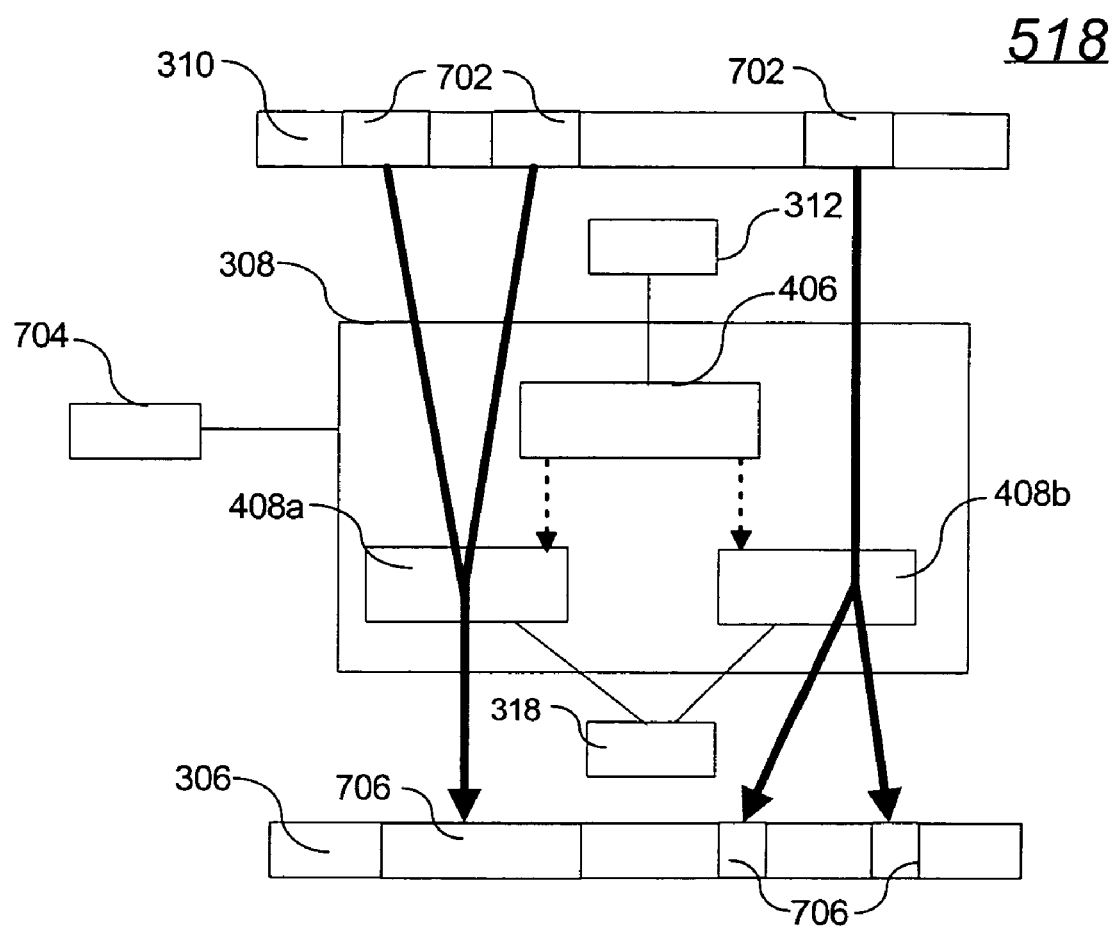
FIG. 7 is a block diagram depicting an operational sequence of an exemplary embodiment of a software protocol stack representing a data transfer between a source data structure and a destination data structure using a DGS-RM operating in "pull" mode, according to an embodiment of the present invention.

In the pull mode 518, which is described in detail in FIG. 6 and illustrated in FIG. 7, the master stack machine 406, running under the control of the remote DGSP 312, identifies a contiguous chunk of data 702 in the exported application data structure 310 and attaches the segment in which it starts, at step 602. The specific steps for performing the attach function (step 602) will be discussed in more detail later. (Note: in FIG. 7, solid arrows represent data flow and dashed arrows represent control from master machine 406 to worker machine 408. Two consecutive invocations of the worker machine 408a, 408b are shown for clarity.) The state cache 704 tracks the current iteration of both the master 406 and worker machines 408. The master stack machine 406 identifies the contiguous chunk 702 of the remote application data structure 310 to the worker machine 408, at step 604. The worker stack machine 408, running under the control of the local DGSP 318, delivers these identified bytes of data 702 to as many locations 706 in the local application data structure 306 as required. FIG. 7 clearly shows benefits brought by the DGS-RM approach: data is copied directly from the source to the destination buffer without the need for an intermediate buffer, hence the memory bandwidth requirement alleviated and CPU overhead is reduced.

The push mode 516 operates similarly to the pull mode 518. In this case, the master stack machine 406, running under control of R-DGSP 312, identifies a contiguous chunk of available memory in the exported application data structure 310 and attaches the segment in which it starts, at step 802. Then, at step 804, the worker machine 408, under L-DGSP 318 control, identifies contiguous bytes of data in the local application data structure 306 and pushes these bytes to the contiguous memory in the remote application data structure 310 that the master machine has identified, at step 806.

Figure 9:
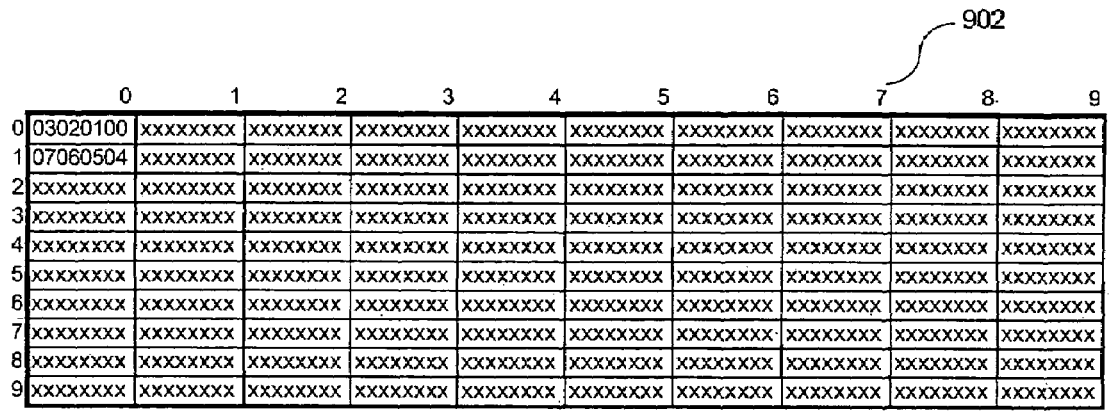
FIG. 9 is a diagram illustrating an exemplary source data structure for exportation and its corresponding memory allocation.
Figure 9:
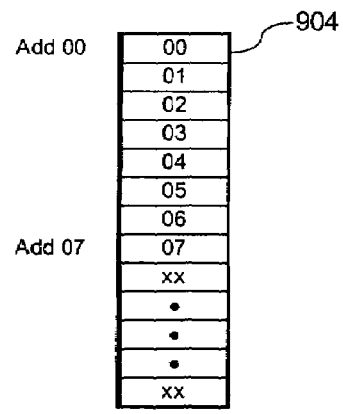

Recall that a DGSP is compiled before any data transfer and is always interpreted in relation to a data object address. That is, a DGSP represents the pattern of data in an application data structure but any particular application is likely to use the same pattern for more than one object. For example, as shown in FIG. 9, in a 10×10 matrix of 4 byte integers, with elements of a column stored adjacent in memory, integers that represent a row will be one column size or 40 bytes apart. In this example, an MPI_Datatype (which can be compiled to a DGSP) describing a row as (every 10th integer beginning with offset zero) can be used to gather/scatter any of the 10 rows by using the address of the first integer in the row as the row's address. The DGSP does not need to change. The user function call on the exporting side of a DGS-RM supplies a parameter triple (object_address,count,datatype) while the DGS-RM itself runs in another address space.

For a basic DGSM running the example MPI_Datatype DGSP, the address of each integer in the row must be calculated in turn by adding each offset computed from interpreting the DGSP to the object_address. If A is the address of the row, the address sequence generated by the basic DGSM would be (A+0, A+40, A+80 . . . A+360). The machine memory architecture for which this implementation of DGS-RM is developed is segmented. Each segment is 256 MB (2**28 bytes), so the low 28 bits of an address represent an offset within a segment and the remaining higher order bits represent a segment identifier.

Within any process, the concatenation of segment ID and segment offset produces a flat virtual address space. When an exported memory range, of one address space, containing an application data structure is to be attached into the import side address space, only one memory segment at a time is attached and the address at which it is mapped in the attaching address space is unlikely to be the address at which it is mapped in the exporting side address space. The master machine of the DGS-RM is processing a data structure the exporting address space where segment boundaries must be managed explicitly while the DGS-RM runs in and process a data structure in the attaching address space where the address space can be treated as flat.

Figure 10:
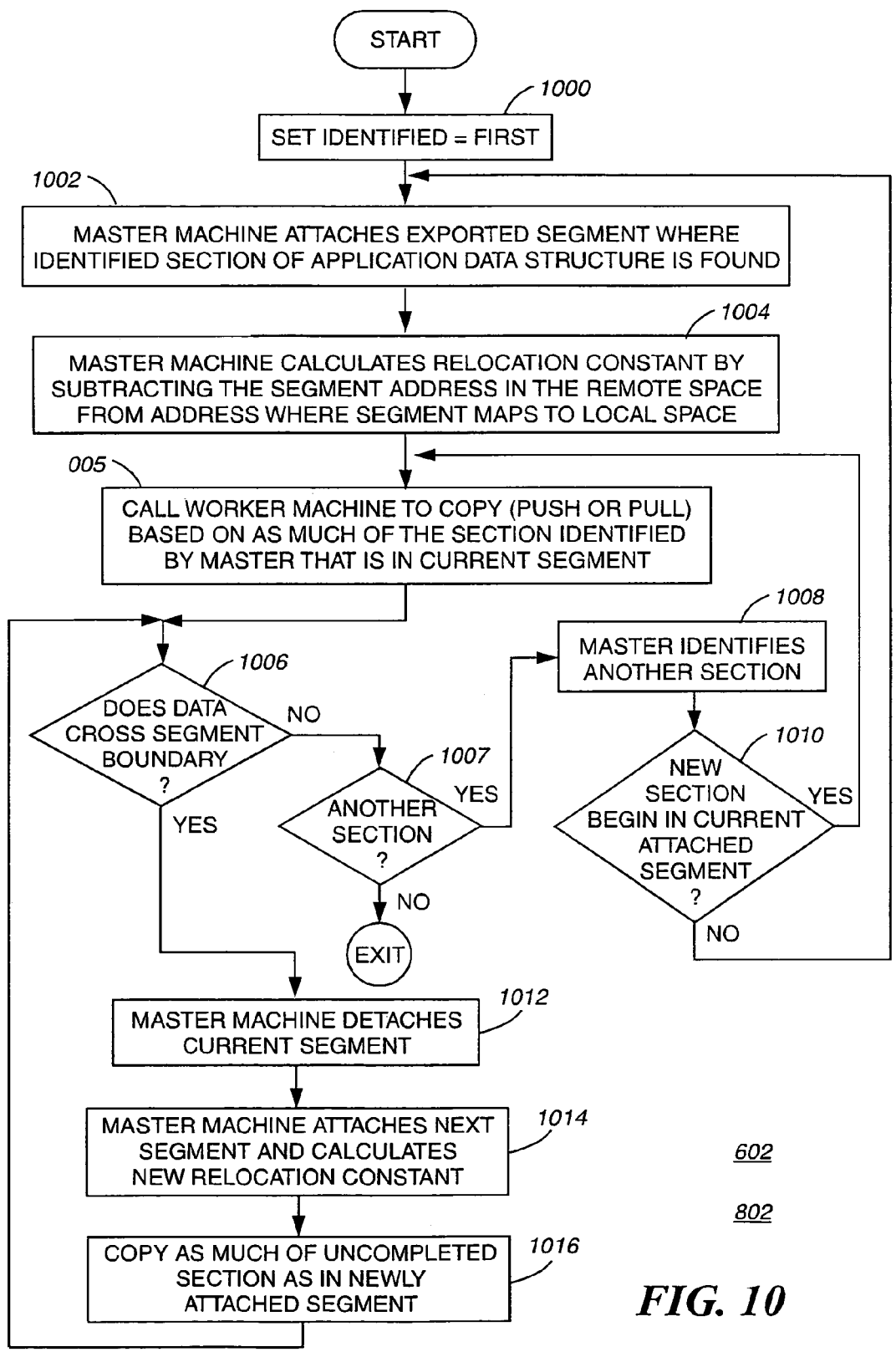
FIG. 10 is an operational flow diagram illustrating an exemplary operational sequence for executing an attach function in accordance with an embodiment of the present invention.

Referring to FIG. 10, one embodiment of the logic associated with the attach sequence performed by master machine 406 is discussed in detail. Initially, a variable, referred to as identified, which is used in the attach processing, is set to first. At DGS-RM startup there is no segment attached, so master machine 406 attaches the exported segment where the identified (e.g., first) chunk of the application data structure begins, STEP 1002. As an example, assume the address of this first chunk is very near the end of segment three of the exporting task's virtual memory, so nine chunks are in segment three and the last chunk is in segment four. Assume the operating system maps the first attach to segment seven of the attaching side address space. To allow the DGS-RM master machine to run as if it were processing within the flat virtual address space in which the DGSP and remote application data structure 310 reside, a relocation constant, C, is calculated at attach time by subtracting the segment address in the exporting address space (R-base) from the address at which the segment maps in the attaching space (a value returned by the function call to do the attach), STEP 1004. In this example, C for the first attach is 0x40000000 and the master machine generates address sequence (A+C+0, A+C+40 . . . ,A+C+360).

Thereafter, the master machine calls the worker machine to copy (push or pull) the data based on as much of the section identified by the master that is in the current segment, STEP 1005.

A determination is then made as to whether the data crosses the segment boundary, INQUIRY 1006. If the exported data object is contained within a segment, then a further inquiry is made as to whether there is another section to be processed, INQUIRY 1007. If not, then processing is complete. However, if there is another section of the application data structure, master machine 406 identifies the section, STEP 1008. Then, a determination is made as to whether the new section begins in the currently attached segment, INQUIRY 1010. If so, processing continues with STEP 1005. Otherwise, processing continues at STEP 1002.

Returning to INQUIRY 1006, if the exported data object spreads across a segment boundary, master machine 406 detaches the current segment, STEP 1012, attaches the segment in which the next chunk is found and calculates a new relocation constant, STEP 1014. For the above example, if the operating system maps the newly attached segment (segment four in the exporting address space) again to segment seven in the attaching address space, the new relocation constant, C, becomes 0x30000000 and the location of the last chunk is still (A+C+360). The modification of C hides the complexity of segment mapping from the rest of the DGS-RM master machine. In the rare case where a single chunk of a data object lies across one or more segment boundaries, the DGS-RM simply calls the worker machine to process that part of the chunk in the current attached segment, replaces the current attach with the next segment containing the continuation of the chunk, and has the worker process that continuation before going on to identify another chunk.

Subsequent to attaching the next segment and calculating a new relocation constant, the worker machine copies as much of the uncompleted section as in the newly attached segment, STEP 1016, and processing continues with INQUIRY 1006.

The concepts for applying DGS-RM to a non-segmented addressing system are simplifications of the described technique and are equally claimed as invention.

A simplification of DGS-RM that omits attach/detach and uses zero as a relocation constant can be used to copy data from one application data structure to another when both data structures are in the same address space. The MPI standard allows a process to send data to itself (with one data object as source and another as destination) and this simplified DGS-RM can be used to provide send-to-self when at least one object is discontiguous.

There are cases where the DGSM approach based on a contiguous intermediate buffer is more efficient than the cross memory attach function and being able to recognize those cases is useful. Note that running DGS-RM, at least for cross memory attach, incurs extra setup and tear down costs compared to a data transfer running two DGSMs doing fill/drain on a pre-allocated intermediate buffer. An activation of the worker machine 408 to copy may be more expensive for a small chunk than the additional copy it saves. If the amount of data in the transfer is small or the master machine side data is fine-grained, it is possible that the extra overhead exceeds the benefit of avoiding one copy. The granularity concern is due to overhead per contiguous chunk on small chunks vs. savings per byte in avoiding double copy. The message size threshold is due to overhead in setting up and taking down the cross memory attach vs. saving per byte in avoiding double copy. In those cases, the DGSM approach should be used.

Figure 1:
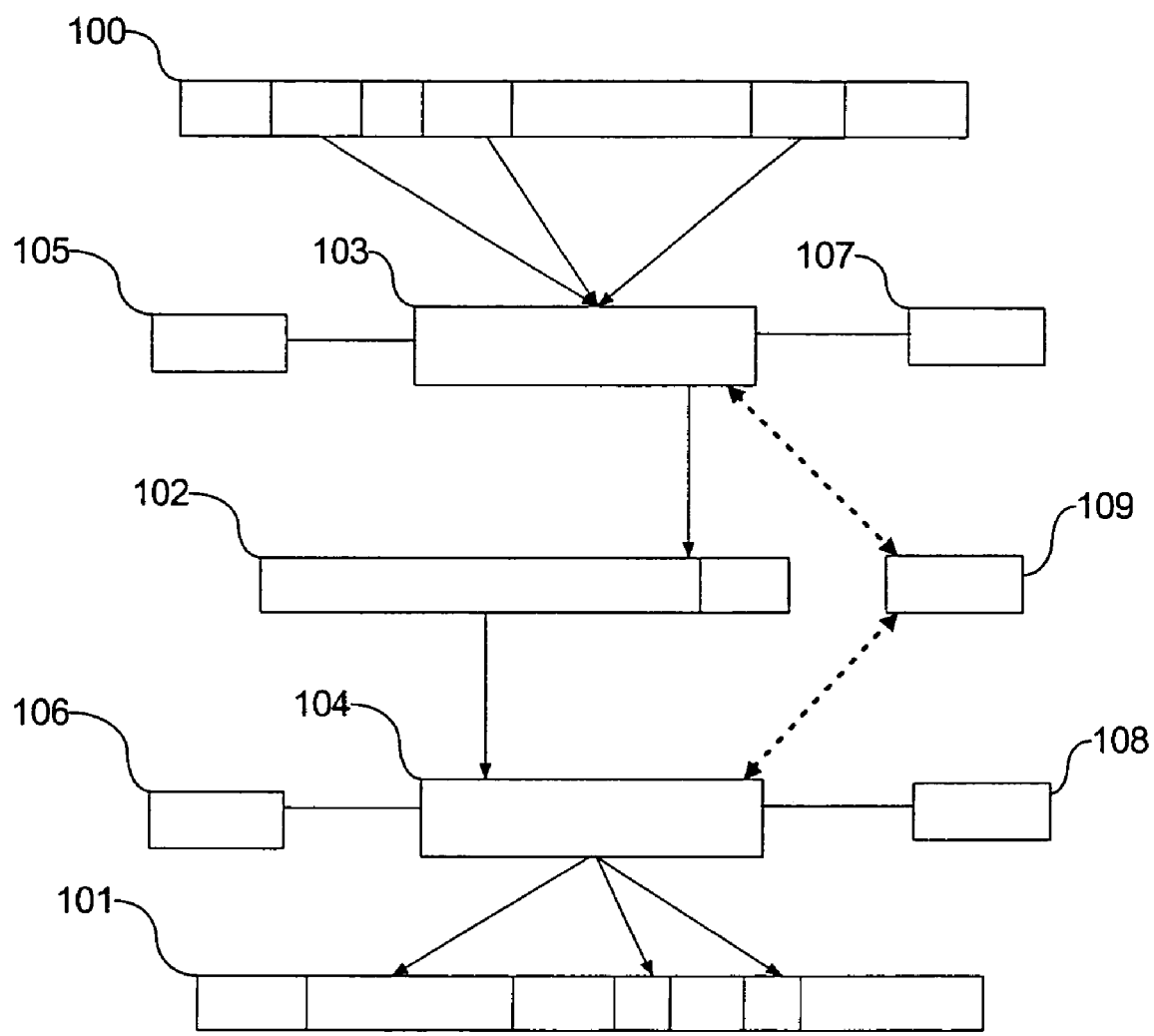
FIG. 1 is a block diagram depicting a operational sequence of an exemplary embodiment of a software protocol stack of a prior art invention representing a data transfer between a source data structure and a destination data structure using a gather DGSM and a scatter DGSM.
Figure 11:
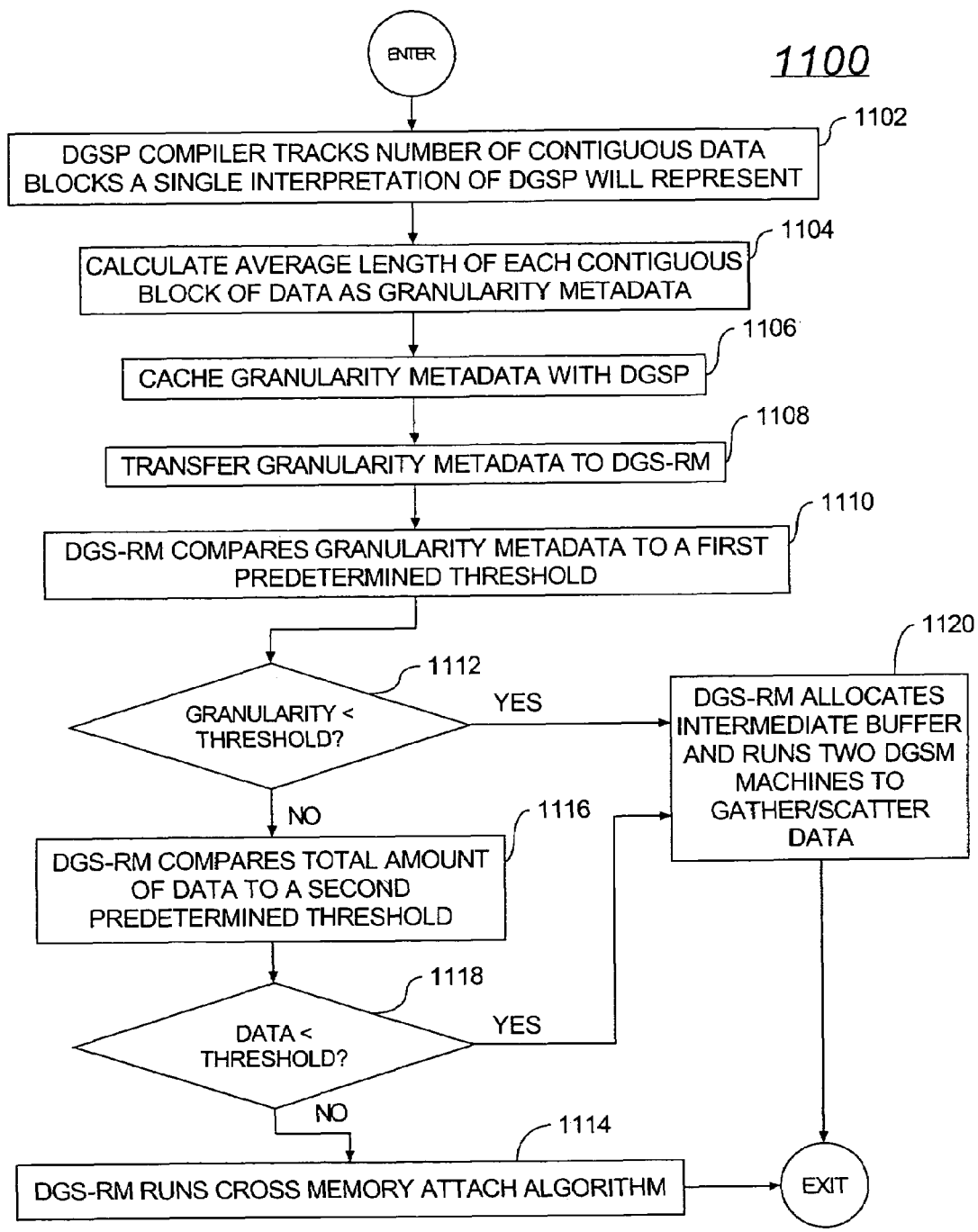
FIG. 11 is an operational flow diagram illustrating an exemplary operational sequence for performing an heuristic approach to a Data Gather/Scatter Function, choosing between a cross-memory attach function with a DGS-RM or using a gather DGSM and a scatter DGSM, in accordance with an embodiment of the present invention.

To recognize data patterns for which the DGSM staging buffer approach should be used, DGSP compilation is enhanced to gather information to support a heuristic in the DGS-RM approach, as illustrated in FIG. 11. While compiling a DGSP 312, at step 1102, the compiler routine keeps track of the number of contiguous data chunks a single interpretation of that DGSP 312 will represent. Together with the amount of data one interpretation of the DGSP 312 transfers, the average length of each contiguous data chunk is calculated at step 1104. This granularity metadata is cached with the DGSP 312, at step 1106, and checked during data transfer, at step 1108. The DGS-RM 308 compares this granularity metadata to a predetermined threshold at step 1110. If the buffer is recognized to be fine-grained (average length of each contiguous data chunk on the master side is less than a predetermined threshold), at step 1112, the DGS-RM 308, at step 1120, will allocate an intermediate buffer and run two DGSM machines to gather and scatter data, as shown in the Prior Art method of FIG. 1. Otherwise, the DGS-RM 308 compares the total amount of data to a second predetermined threshold at step 1116. If the total amount of data is small, at step 1118, again, the DGS-RM 308, at step 1120, will allocate an intermediate buffer and run two DGSM machines to gather and scatter data. If the granularity is not too small and there is a sufficient total amount of data, the DGS-RM 308, enters the cross memory attach sequence at step 520 (See FIG. 5) and creates the master 406 and worker machines 408. The thresholds are tunable based on platform-independent factors such as message size and platform-dependent characters such as memory copy bandwidth, cross memory setup/teardown cost and the cost of each activation of the worker machine (the cost of the subroutine call).

One of the major benefits brought by the cross-memory attach mechanism is the minimized number of memory copies. To an application, time and system resource devoted to communication is just overhead and reducing that overhead is valuable. Depending on the solution, the new cross-memory attach mechanism solution could carry greater overhead than the DGSM solution, therefore the heuristic approach in choosing between the two methods offers great benefit.

In an example embodiment of the present invention, the platform can be any computer on which multiple processes, each running a process with its own address space but under a single OSI which supports mapping of address ranges between distinct address spaces, can be run to exploit multiple processors which may not have access to a single common address space. It will be apparent to those skilled in the art that implementation is not limited to such an exemplary platform.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer-implemented method of transferring data between two application data structures, the method comprising:
  copying a first data gather scatter program (DGSP) from an exporting process address space where a first application data structure is located to a location in shared memory that is visible to an importing process address space;
  assembling a first parameter set in the shared memory location that identifies the first application data structure in the exporting process address space;
  starting a data gather scatter-redistribution machine (DGS-RM) in an importing process space where a second application data structure is located
  passing the first parameter set and the copy of the first DGSP to the DGS-RM, both the first parameter set and copy having been copied to shared memory, and a second parameter set identifying the second application data structure and a second DGSP, both local to the importing process space;
  determining a mode of operation from a push mode and a pull mode;
  creating a master stack machine and a worker stack machine, and wherein the mode of operation is determined to be one of:
  a pull mode, comprising:
    identifying a contiguous chunk of the first application data structure in the exporting process address space by the master stack machine, the master stack machine running under control of the DGSP previously copied from the exporting process space;
    identifying as many contiguous chunks of the second application data structure in the importing process address space, by the worker stack machine, as needed to receive all bytes of the contiguous chunk of the first application data structure, the worker stack machine running under control of the DGSP in the importing process address space; and
    copying (pulling) the bytes of the identified chunk of the first application data structure, by the worker stack machine, from the first application data structure to the as many as needed identified contiguous chunks of the second application data structure; and
  a push mode, comprising:
    identifying a contiguous chunk of the first application data structure in the exporting process address space by the master stack machine, the master stack machine running under control of the DGSP previously copied from the exporting process space;
    identifying as many contiguous chunks of the second application data structure in the importing process address space, by the worker stack machine, as needed to supply all bytes to the contiguous chunk of the first application data structure, the worker stack machine running under control of the DGSP in the importing process address space; and
    copying (pushing) the bytes for the identified chunk of the first application data structure, by the worker stack machine, to the first application data structure from the as many as needed identified contiguous chunks of the second application data structure.

2. The computer-implemented method of claim 1, wherein the identifying a contiguous chunk of the first application data structure step comprises:
  attaching a memory segment where a current chunk of the first application data structure is located;

calculating a relocation constant by subtracting a segment address of the first application data structure in the exporting process space from a segment address at which the attached memory segment is mapped in the importing space; and determining if the contiguous chunk of the first application data structure crosses a segment boundary.

3. The computer-implemented method of claim 2, where in response to the contiguous chunk of the first application data structure determined not to cross a segment boundary, then processing the cuffently attached chunk; and proceeding to the next chunk of the first application data structure to be exported.

4. The computer-implemented method of claim 2, where in response to the contiguous chunk of the first data structure determined to cross a segment boundary, then determining a length of a contiguous fragment of the current chuck of the first application data structure contained within the current memory segment;

processing the current fragment;

detaching the attached memory segment;

attaching a subsequent segment; and calculating a new relocation constant.

5. The computer-implemented method of claim 1, wherein at least one of the first application data structure and the second application data structure is discontiguous.

6. The computer-implemented method of claim 1, wherein at least one of the first application data structure and the second application data structure is contiguous.

7. The computer-implemented method of claim 1, wherein the first application data structure and the second application data structure are located within a same address space.

8. The computer-implemented method of claim 1, wherein the first application data structure and the second application data structure are located within separate address spaces.

* * * * *